Oct. 27, 1953  E. G. STICH  2,657,174
CONTINUOUS MANUFACTURE OF YEAST
Filed April 14, 1950
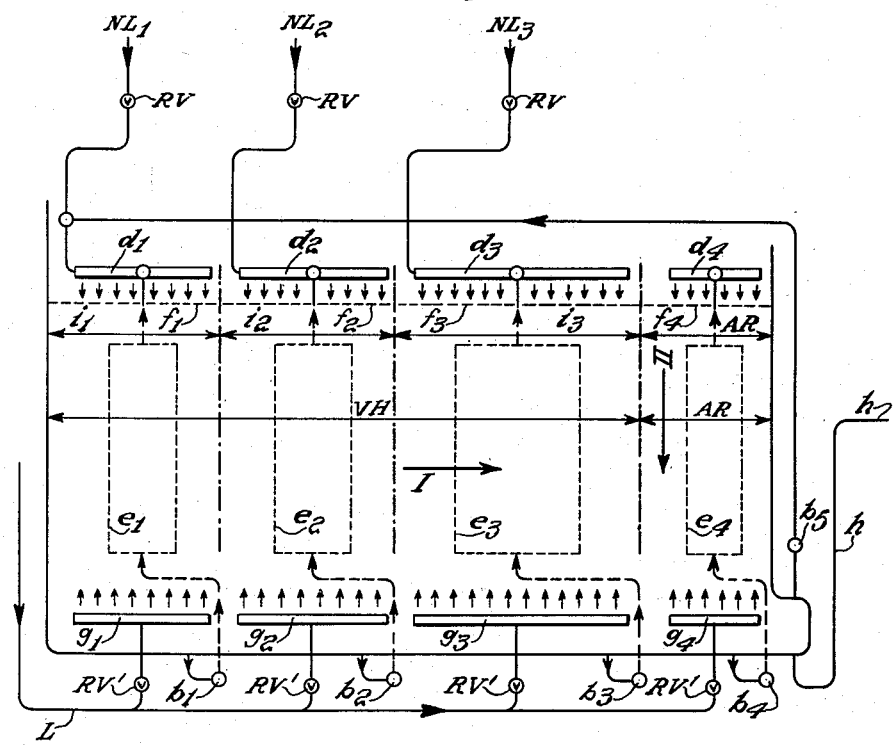
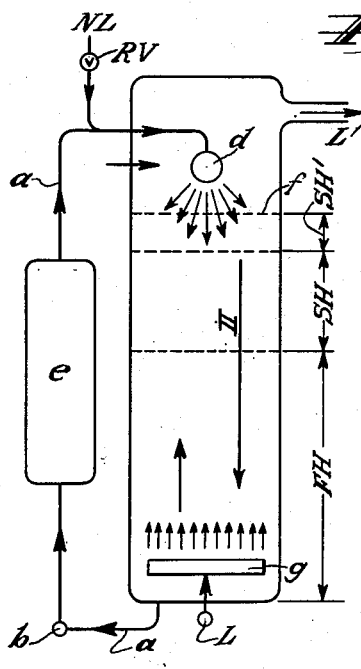
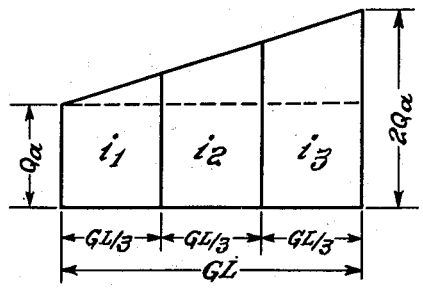
INVENTOR.
Eugen Georg Stich
BY
AG'T

Patented Oct. 27, 1953

2,657,174

UNITED STATES PATENT OFFICE 2,657,174

CONTINUOUS MANUFACTURE OF YEAST

Eugen Georg Stich, Heidelberg, Germany

Application April 14, 1950, Serial No. 155,806
In Switzerland June 17, 1949

15 Claims. (Cl. 195—94)

This invention consists in a method for continuous raising of yeast and extraction of alcohol, by which the mash is guided in circulation in a yeasting and fermenting apparatus, and in an installation for carrying out the said method. The purpose of the invention is to regulate the quantity of air contained in the mash by means of a specially guided circulation of the mash, to effect the elimination of the heat produced and a thoroughgoing mixing up of the quantities of nutritive solution to be supplied with the circulating quantities of mash, and, moreover, to utilize the circulating air-free quantities of mash for destroying the foam. Another object of the invention is to regulate the increment of yeast by means of an additional circulation with an adjustable circulating period of the mash, taking at the same time the different periods of assimilation of the nutritious substances contained in the nutritive solution into account.

The first of these objects is achieved by the fact that the circulation of the mash takes place counter-current to the rising air bubbles; the second, by the fact that the yeasting chamber is subdivided into several compartments with separate mash circulations arranged in series so as to constitute a common circulation, whose circulating period can be adapted to the generating time of the respective yeast race by allowing for an adequate ripening time.

If the increment of yeast is to be withdrawn continuously, the quantity of yeasty mash discharged, with the filling of the vat being constant, will be equal to the continuously supplied quantity of nutritive solution, whereas the proportion of nutritious substances contained in the solution will correspond to the proportion of yeast contained in the mash and determined by the circulating period of the total circulation, and to the yield obtainable. The supply of nutritive solution can be effected in such a way that each compartment of the vat, independently of its volume, is supplied with the same quantities of nutritive solution containing the same proportions of nutritious substances, so that the first compartment will receive an excess of nutritious substances, and the last yeasting compartment comparatively less nutritious substances.

On the other hand, the contents in phosphates and nitrogen of the quantities of nutritive solution supplied to the individual compartments can be adjusted in such a way that they will decrease in the direction of the total circulation, whereas the percentages of sugar will either remain the same or increase. In order to keep the contents in yeast of the mash in the vat constant, the volumes of the individual compartments of the yeasting chamber of the vat are increased in proportion with the actual increment of yeast, owing to which the time of passage of the mash is uniform or approximately uniform. To the yeasting chamber a ripening compartment is annexed, whose contents in mash are determined by the time of passage, which is adapted to the ripening time of the yeast. As the circulating period of the mash in the total circulation is to guarantee the increment of yeast and the integral utilization of the nutritious substances, the circulation is regulated by a pump built into the circulation piping, whereas the actual filling of the yeasting and fermenting vat can be adjusted by means of a height adjusting device for the discharge of mash, which, together with the regulation of the circulating time, allows of an exact adaptation of the contents in yeast of the mash to the supply of nutritious substances.

When producing alcohol, a corresponding solution of sugar can be supplied to an additional fermenting chamber into which the mash discharged from the ripening compartment is conveyed and fermented outside the total circulation, the mash too being put there into separate circulation, for the purpose of removing the heat produced, the volume of the fermenting chamber being determined by the fermenting time required and by the proportion of alcohol contained in the quantity of mash increased by the sugar solution added to it. This arrangement is intended to separate the fermentative action of the yeast from the vegetative one, and it reduces the temporary energetic charge of the same, as well as the temporary production of heat.

In order to elucidate some further details of the invention, reference is made to the accompanying drawing in which:

Fig. 1 shows the scheme of a yeasting plant with double circulation, whereby the mash is separated by compartments and conducted in the circulation II counter-current to the direction of the rising air bubbles, after which the individual compartments are connected in series so as to constitute a common circulation I.

Fig. 2 shows a cross section of a compartment of the installation for carrying out my method, whereby which the mash is repumped counter-current to the rising air bubbles.

Fig. 3 is in a diagram showing how the quantity of yeast $Q_a$ is increased within a generating period, Fig. 1 showing the contents of the individual compartments of the yeasting chamber proportionally to that increase.

With the installation for carrying out the counter-current method, see Fig. 2, the circulation line $a$ is provided with a regulating pump $b$. At the top end of the vat $c$ there is a distributor $d$ which breaks up into jets of liquid the air-free mash pumped off the bottom of the vat and pumped into it, if necessary under pressure above atmospheric. These jets of liquid destroy the foam produced by the aeration of the mash. The circulation line $a$ leads the mash through a cooler $e$ which removes the heat continuously engendered during the yeasting process. In order to maintain a predetermined thickness of the foam $SH'$, a sieve $f$ is provided in the vat $c$ above the surface of the mash, through the holes of which the foam passes so as to be destroyed by the jets of mash. An aerating system $g$ provides for the aeration of the mash contained in the vat $c$. L indicates the inlet pipe for the sterile air, $L'$ the outlet pipe for the exhaust air. The nutritive solution NL is mixed up with the mash in the circulation line $a$ and uniformly distributed with the same over the surface of the mash. FH shows the filling height of the mash in the fermenting vat, SH the rising height of the mash due to aerating. No special de-aerating of the mash is required when working according to my method, since the air bubbles will automatically escape from the mash flowing in opposite direction.

If, by way of example, the flowing velocity of the mash in circulation $II = v_m$ is approximately equal to the rising velocity of the bubbles $v_a$, the volume of air will be determined according to the formula $$SH = \frac{FH \cdot v_e}{v_a - v_m - v_e}$$

wherein $v_e$ is the inlet velocity of the air in the cross section of the vat and FH is the filling height of the mash in the vat.

The following table shows that, by adjusting the circulating velocity $v_m$ of the mash, the volume of air in the aerated mash can be regulated as required:

| $v_a$ | $v_b$ | $v_m$ | SH |
|---|---|---|---|
| 4 | 1 | 1 | ½ FH |
| 4 | 1 | 2 | 1 FH |
| 4 | 1 | 2,5 | 2 FH |

On the proportion of air contained in the mash $Q_1$ in m.$^3$ depends the diffusion surface O in m.$^2$:

$$O = \frac{Q_1 \cdot 6 \cdot 10^3}{d}$$

which is decisive for the supply of the yeast cells with respiration oxygen, $d$ being the diameter of the bubbles in mm.

In the arrangement according to Fig. 1, several such counter-current compartments are connected in series in a total circulation; here, e. g., the vat contains a yeasting chamber VH consisting of three compartments $i_1$, $i_2$, $i_3$ and a ripening compartment AR. Each of the compartments $i_1$—$i_3$ as well as AR. possess a counter-circulation of their own with the pumps $b_1$—$b_4$ and the distributors $d_1$—$d_4$ for destroying the foam, besides coolers $e_1$—$e_4$ for all of them and an aerator $g$ corresponding to the size of each of them. The filling heights FH, the rising heights SH due to aerating, and the admitted foam thicknesses SH' should be the same in all the compartments; the compartments contain sieves $f$, whose heights above the mash level are adjustable. The regulating valves RV serve to regulate the quantities of the nutritive solutions $NL_1$—$NL_3$ supplied, and valves RV' regulate the quantities of air supplied to the individual compartments through the pipes L for sterile air. The total circulation is regulated by a pump $b_5$, whilst additional regulation of the mash volume can be achieved by changing the filling height FH in the vat by means of a height adjusting device for the outlet of the withdrawal pipe $h$.

In order that the supply of nutritive solution and the degree of aerating may be constant, it will be necessary that the contents in yeast of the mash in the vat should not change and that the contents of the compartments should be increased with respect to each other according to the ratio seen from the diagram of Fig. 3, the filling heights being the same.

The method is carried out in a continuous operation as follows:

The installation is started at first by doubling half the quantity of pitching-yeast supplied to the vat so as to attain the concentration of yeast required, e. g. from 50 to 100 kg. per m.$^3$ of mash. Once that concentration is reached, the further increment is continuously withdrawn, the quantity of nutritive solution corresponding to the quantity of mash discharged, with which the increment per second of yeast of the contents in yeast of the mash in the yeasting chamber is carried off, from which results the concentration of the molasses and nutritious salts in the nutritive solution, taking the attainable yield of yeast into account.

If, e. g., the vat contains 1000 kg. of yeast of 25% of dry substance, the increment of yeast $q_s$ to be taken off per second, and, with it, the quantity of mash to be taken off, or the quantity of nutritive solution to be supplied, can be calculated according to the following equation:

$$q_s = Q_a \cdot 2^{1/GZ} - Q_a$$

GZ signifying the generating period of the yeast race, in seconds, $Q_a$ being 1000 kg. In addition to that, if the contents in yeast of the mash is HC%, the quantity of mash $q_m$ to be carried off per second will be $$q_m = \frac{100 \cdot q_s}{HC\%}$$

It is to that quantity of mash that the quantity of nutritive solution to be supplied will correspond. If the amount of yeast in the vat is to be constant, the quantities of mash contained in the compartments will increase for three compartments in the yeasting chamber in the ratio of $1.26 : 1.26^2 : 1.26^3$, so that the first compartment will contain 26% of the total quantity of yeast contained in the total mash, the second 32.8%, and the third 41.2%. Though these quantities of yeast differ from one compartment to another, it will be suitable to supply each compartment with the same quantity of nutritive solution $NL_1$, $NL_2$, $NL_3$, possessing the same proportion of nutritious substances, owing to which a predetermined part of the less assimilable nutritious salts will be allowed to stay longer in the vat, and the total of nutritious substances contained in the nutritive solution can be assimilated integrally during the circulating period. Should that not prove adequate in certain cases, e. g. for shortening the circulating period, the degrees of concentration of the quantities of nutritive solution NL₁—NL₃ can be varied so that the contents in phosphate and nitrogen will decrease for the successive compartments in the direction of the total circulation I, and that, on the other hand, their contents in sugar will remain the same, or, if required, its percentage will increase, whereas the quantities of nutritive solution for each compartment will remain equal to each other.

For carrying out the double circulation method according to my invention, the mash can also circulate in parallel flow with the rising air bubbles.

I claim:

1. Method for the continuous manufacture of yeast, comprising withdrawing yeast-containing mash from the bottom of a fermentation chamber, causing the mash to flow upwardly outside said chamber, cooling the mash adding a nutritive solution to the mash, causing the mixture of mash and nutritive solution to enter the fermentation chamber at its top, evenly distributing said mixture over the area of the chamber, causing the distributed mixture to act upon foam produced during fermentation, allowing the mixture to flow downwardly, introducing air into the fermentation chamber near its bottom, breaking up the air into bubbles, and allowing the air bubbles to rise in counter-current to the path of said mixture within the fermentation chamber, whereby the diffusion surface of the air bubbles is maintained so as to ensure a uniform oxygen supply.

2. The method according to claim 1, wherein the air bubbles are allowed to be effective until the permissible limit of impoverishment in oxygen is reached.

3. The method according to claim 1, wherein the mash, after its withdrawal from the fermentation chamber and before its mixing with the nutritive solution, is placed under superatmospheric pressure and is cooled.

4. Method for the continuous manufacture of yeast, comprising withdrawing yeast-containing mash in more than one place from the bottom of a fermentation chamber, causing the mash drawn off in each place to flow upwardly outside said chamber, cooling the mash on each of its paths adding in each case a nutritive solution to the mash, causing each mixture of mash and nutritive solution to enter a different zone in the fermentation chamber, evenly distributing each mixture over the area of the respective zone, causing the distributed mixture to act upon foam produced in the zone during fermentation, allowing the mixture to flow downwardly, introducing air into each zone near its bottom, breaking up the air into bubbles, allowing the air bubbles to rise in counter-current to the path of each mixture within its fermentation zone, whereby the diffusion surface of the air bubbles is maintained so as to ensure a uniform oxygen supply in each of the zones, and causing the mash to circulate from zone to zone.

5. The method according to claim 4 wherein the supply of nutritive solutions to said zone, the circulation of mash in each zone, and the circulation of mash from zone to zone are adjusted to the desired increase in yeast.

6. In the method according to claim 4, providing zones of different volume, and supplying the same quantity of nutritive solution to each zone.

7. In the method according to claim 4, providing one zone next to one other zone, and supplying nutritive solutions to the zones, whereby the contents in phosphates and nitrogen decrease toward the end zone, and the percentage in sugar remains the same.

8. In the method according to claim 4, providing one zone next to one other zone, and supplying nutritive solutions to the zones, whereby the contents in phosphate and nitrogen decrease toward the end zone, and the contents in sugar increases toward the end zone.

9. In the method according to claim 4, withdrawing mash in another place from the bottom of said chamber, causing said mash to flow upwardly outside the chamber, recycling the mash to another zone in the fermentation chamber, evenly distributing the mash over the area of said other zone, allowing the mash to flow downwardly, introducing air into said other zone near its bottom, breaking up the air into bubbles, allowing the air bubbles to rise in counter-current to the path of the mash within the other fermentation zone, and allowing the yeast in said other zone is ripen.

10. The method according to claim 9, wherein the circulation of mash from zone to zone is adjusted to the supply of nutritive solutions.

11. The method according to claim 9, wherein the circulation of mash from zone to zone and the time the mash is to spend in the ripening zone are adjusted to the generating time of the yeast being manufactured.

12. The method according to claim 9, comprising withdrawing the mash from the ripening zone, conducting same to an alcohol-forming zone, adding a sugar solution to the mash in the alcohol-forming zone, causing the mash of said alcohol-forming zone to flow upwardly outside said zone to be recycled, and cooling the mash while outside the zone.

13. Installation for the continuous manufacture of yeast, comprising a closed vat, a cooler, a distributor, a sieve, an aerating system, said distributor, sieve and aerating system being arranged within the vat, the distributor being arranged at the top, the aerating system being arranged at the bottom, a mash-outlet pipe leading from the bottom of the vat through the cooler to the distributor, an inlet pipe for a nutritive solution leading into the mash-outlet pipe at a point between the cooler and the vat, the sieve being arranged to separate the layer of foam formed in the vat, an air-inlet pipe leading to the aerating system, an outlet pipe to discharge exhausted air from the vat, and means to propel and control the flow of fluids.

14. Installation for the continuous manufacture of yeast, comprising a container, apertured partition walls in said container, said partitions forming more than one fermentation zone and one yeast-ripening zone, a set including a cooler, a distributor, a sieve, and an aerating system for each of said zones, a distributor, a sieve, and an aerating system being arranged within each zone, the distributor being arranged at the top of its zone, and the aerating system being arranged at the bottom of its zone, a mash-outlet pipe leading from the bottom of each zone through the respective cooler to the distributor of the same zone, an inlet pipe for a nutritive solution leading into the mash-outlet pipe of each of the fermentation zones at a point between the cooler anad the zone, each of the sieves being arranged to separate the layer of foam formed in the zone, an air-inlet pipe leading to the aerating system of each zone, means to propel and control a circulation of fluid in each zone, means to propel and control a circulation of fluid from zone to zone, and means to propel and control the flow of air.

15. In the installation according to claim 14, a mash-discharge line leading from the bottom of the yeast-ripening zone upwardly to regulate the height of the contents of the container.

EUGEN GEORG STICH.

References Cited in the file of this patent

UNITED STATES PATENTS

| Number | Name | Date |
| --- | --- | --- |
| 467,993 | Jorgensen | Feb. 2, 1892 |
| 668,080 | Barbet | Feb. 12, 1901 |
| 1,680,043 | Heijkenskjold | Aug. 7, 1928 |
| 1,884,272 | Sak | Oct. 25, 1932 |
| 2,123,463 | Effront | July 12, 1938 |
| 2,190,689 | Torrington | Feb. 20, 1940 |
| 2,244,902 | Stich | June 10, 1941 |